US011463584B2

(12) United States Patent
Gujar et al.

(10) Patent No.: US 11,463,584 B2
(45) Date of Patent: Oct. 4, 2022

(54) SYSTEM AND METHOD FOR ROUTING AN EMERGENCY CALL

(71) Applicant: Reliance Jio Infocomm Limited, Ahmedabad (IN)

(72) Inventors: Yatin Gujar, Mumbai (IN); Shilpa Salunkhe, Mumbai (IN); Thiagarajan Arumugam, Mumbai (IN); Rajeev Gupta, Mumbai (IN)

(73) Assignee: Reliance Jio Infocomm Limited, Ahmedabad (IN)

( * ) Notice: Subject to any disclaimer, the term of this patent is extended or adjusted under 35 U.S.C. 154(b) by 0 days.

(21) Appl. No.: 17/133,946

(22) Filed: Dec. 24, 2020

(65) Prior Publication Data

US 2021/0195024 A1 Jun. 24, 2021

(51) Int. Cl.
| | | |
|---|---|---|
| *H04M 3/51* | (2006.01) | |
| *G06F 16/955* | (2019.01) | |
| *G06Q 50/26* | (2012.01) | |
| *H04M 3/42* | (2006.01) | |

(52) U.S. Cl.
CPC ......... *H04M 3/5116* (2013.01); *G06F 16/955* (2019.01); *G06Q 50/265* (2013.01); *H04M 3/42348* (2013.01); *H04M 3/5191* (2013.01); *H04M 2242/04* (2013.01)

(58) Field of Classification Search
CPC .............. G06F 16/955; G06Q 50/265; H04M 3/42348; H04M 3/5116; H04M 3/5194; H04M 2242/04; H04W 4/02–029; H04W 64/00–006

USPC ...................................................... 379/37–52
See application file for complete search history.

(56) References Cited

U.S. PATENT DOCUMENTS

| | | | | |
|---|---|---|---|---|
| 8,731,515 | B2 * | 5/2014 | Muhonen | H04W 76/50 455/404.2 |
| 2007/0149243 | A1 * | 6/2007 | Hwang | H04W 40/02 455/551 |
| 2011/0026440 | A1 * | 2/2011 | Dunn | H04W 4/90 370/259 |
| 2018/0124584 | A1 * | 5/2018 | Venkatraman | H04W 76/50 |

* cited by examiner

*Primary Examiner* — Hemant S Patel
(74) *Attorney, Agent, or Firm* — Finnegan, Henderson, Farabow, Garrett & Dunner

(57) ABSTRACT

A method and a system for routing an emergency call to a PSAP [322]. Upon receiving an emergency call request from at least one user device [302] at an eNodeB [304], an ESMLC [310] computes a current location information of the at least one user device [302]. Further, a GMLC [312] identifies a serving cell identifier for the at least one user device [302] based on the current location. Furthermore, an emergency location platform [314] identifies at least one PSAP [322] in a cell site master database [316] based on the serving cell identifier and extracts one or more parameters for the at least one user device [302] from a subscriber information database [318]. Lastly, the emergency location platform [314] provides at least one of the current location information and the one or more parameters to the identified at least one PSAP [322] on an access network channel.

26 Claims, 14 Drawing Sheets

SYSTEM AND METHOD FOR ROUTING AN EMERGENCY CALL

TECHNICAL FIELD

The present invention generally relates to Heterogenous Networks (HetNet) and more particularly relates to identifying location of an emergency caller and to route the emergency call to a public-safety answering point (PSAP).

BACKGROUND OF THE INVENTION

The following description of related art is intended to provide background information pertaining to the field of the invention. This section may include certain aspects of the art that may be related to various features of the present invention. However, it should be appreciated that this section be used only to enhance the understanding of the reader with respect to the present invention, and not as admissions of prior art.

In a traditional cellular deployment, service operators are now reinforcing their macro-cells deployment with one or multiple low powered small cellular cells (generally termed as Femto/Pico/Micro cells) placed at multiple strategic locations within one or more macro coverage areas. This kind of reinforced cellular network is generally termed as Heterogeneous Network, in short, HetNet. For a typical HetNet, strategic locations for small cells generally include areas with high density of users, such as shopping malls, airports, railway/bus stations, colleges, etc. Also, these locations might include areas with dead-spots, or areas with low macro signal strength, such as indoor establishments or peripheral locations of a macro coverage area. HetNet provides increased mobile data capacity along with providing better mobile coverage, thereby enhancing the overall user's mobile broadband experience.

Wi-Fi technology has witnessed tremendous growth and commercialization in the recent years. Almost all the available user devices (or user equipment) with cellular capability support also tend to have Wi-Fi capability in order to connect to Wi-Fi networks operating in the unlicensed frequency bands, either 2.4 GHz or 5 GHz. Therefore, the cellular operators are motivated to use ubiquitous and cost-effective Wi-Fi technology in pursuing the overall HetNet strategy, for instance, deploying low powered Wi-Fi cells along with cellular small cells at multiple strategic locations identified for a HetNet. Further, for ease of maintenance and provision, few operators are also beginning to use Wi-Fi integrated versions of small cellular cells, wherein a Wi-Fi and cellular small cell technology are made available on common equipment.

Telecom service operators today are looking for a green field deployment to enable any SIM subscribers to make/receive emergency voice & video calls using any un-trusted/un-managed WiFi environment (like the VoLTE emergency calls), such that the emergency services can be provided to SIM based subscribers locally over any environment. With the technology growing at a tremendous rate, a demand has arisen for emergency alert mechanism for disposal of the consumers during emergency incidents across the globe that may pose a threatening environment.

The location information plays a critical role in emergency services, for instance, one purpose of the location information is to enable the IMS network to determine which Public-Safety Answering Point (PSAP) serves the area where the user device is currently located such that the IMS network can route the emergency call to the correct PSAP. A second purpose of the location information is for the PSAP to get more accurate or updated location information for the user device during or after the emergency session required by local authorities to ascertain the facts of the emergency incidence. For offering effective emergency assistance to a distress caller, the authorities have taken an initiative to deploy centralized PSAPs in each state. As part of this initiative, all TSPs are required to establish connectivity with respective state PSAP for providing the location coordinates of emergency caller. The emergency calls shall continue to be routed via existing POI connectivity with anchoring TSP. In any country, a mix of 2G, 3G & 4G subscriber along with Het-net environment base exists. Due to this, Pan-country IMS based interfaces do not exist across service operators.

Traditionally whenever a subscriber dials an Emergency call to a PSAP, the user device location is required by PSAP for the PSAP to serve the subscriber effectively. In 2G/3G networks, there is no standard based interface to provide the location of emergency caller along with his emergency call to PSAP. However, in 4G technology, the service operator sends the location of the emergency caller over SIP interface to PSAP as long as the PSAP has an IMS support. However, in the current scenario, the PSAP does not support IMS interfaces and continue to receive emergency calls over TDM interface. The PSAPs also continue to receive emergency calls from the TSPs over TDM interface only. For receiving location information, the service operators establish VPN connectivity. Thus, whenever PSAP receives an emergency call, they get the MSISDN of the caller. Also, with Mobile Number Portability (MNP) implementation, the PSAP has to perform MNP dip to get the serving operator details. The PSAP then performs a location query to serving operator for the emergency calling MSISDN. The service operator provides Mobile Location Protocol (MLP) interface for performing the location query over established VPN connectivity. This query is served via service operator's emergency location servers, which internally queries respective GMLC and provides the location to PSAP in response. In this call flow, the emergency call and corresponding location query from the PSAP may not be accomplished at the same time instance, and the location query often gets delayed due to platform or transport issue. In such scenarios, the location coordinates provided by the service operator with respect to the actual location of emergency caller may vary. Additionally, there can be failures in location query due to subscriber not reachable/switched off or other network issues. Therefore, in view of the above highlighted and other inherent limitations in the existing solutions, there exists a need in the art to provide a system and a method for automatically identifying a location of the emergency caller and to route the emergency call to a PSAP.

SUMMARY

This section is provided to introduce certain objects and aspects of the present invention in a simplified form that are further described below in the detailed description. This summary is not intended to identify the key features or the scope of the claimed subject matter. In order to overcome at least a few problems associated with the known solutions as provided in the previous section, an object of the present invention is to provide a system and a method for routing an emergency call to a public-safety answering point (PSAP). Another object of the present invention is to provide a system and a method for providing seamless emergency services on 3GPP access network to a user device. Yet another object of the present invention is to provide a method and a system for providing emergency caller location to IMS non-compliant PSAP. Yet another object of the present invention is to provide a method and a system for reducing PSAP response time in providing emergency services. Yet another object of the present invention is to provide a method and a system for routing the emergency call to a serving area PSAP and not to the home circle PSAP. Yet another object of the present invention is to provide a method and a system for providing efficient emergency services in a cost-effective manner within the existing deployed EPC Network to cater the huge traffic in heterogeneous network.

Yet another object of the present invention is to provide a method and a system for providing the SIM based subscribers to be able to dial in emergency numbers and avail emergency service facility defined by authorities while registering.

In order to achieve at least some of the above-mentioned objectives, the present invention provides a method and system for routing an emergency call to a public-safety answering point (PSAP). A first aspect of the present invention relates to a method for routing an emergency call to a public-safety answering point (PSAP). The method comprises receiving, from at least one user device, an emergency call request at an eNodeB. Next, an Evolved Serving Mobile Location Center (ESMLC) computes a current location information of the at least one user device based on the emergency call request. Further, a Gateway Mobile Location Center (GMLC) identifies a serving cell identifier for the at least one user device based on the current location. Furthermore, an emergency location platform identifies at least one PSAP for the at least one user device in a cell site master database based on the serving cell identifier. Subsequently, the emergency location platform extracts one or more parameters for the at least one user device from a subscriber information database based on the emergency call request. Lastly, the emergency location platform provides at least one of the current location information and the one or more parameters to the identified at least one PSAP on an access network channel.

Another aspect of the present invention relates to a method for routing an emergency call to a public-safety answering point (PSAP). The system comprises an eNodeB, an Evolved Serving Mobile Location Center (ESMLC), a Gateway Mobile Location Center (GMLC), an emergency location platform and at least one PSAP, all the components connected to each other unless otherwise indicated and work in conjunction to achieve the objects of the present invention. The eNodeB is configured to receive an emergency call request from at least one user device. The ESMLC is configured to compute a current location information of the at least one user device based on the emergency call request.

The GMLC is configured to identify a serving cell identifier for the at least one user device based on the current location. The emergency location platform is configured to identify at least one PSAP for the at least one user device in a cell site master database based on the serving cell identifier. The emergency location platform is further configured to extract one or more parameters for the at least one user device from a subscriber information database based on the emergency call request. The emergency location platform is also configured to provide at least one of the current location information and the one or more parameters to the identified at least one PSAP on an access network channel.

BRIEF DESCRIPTION OF DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components, electronic components or circuitry commonly used to implement such components.

Figure 1:
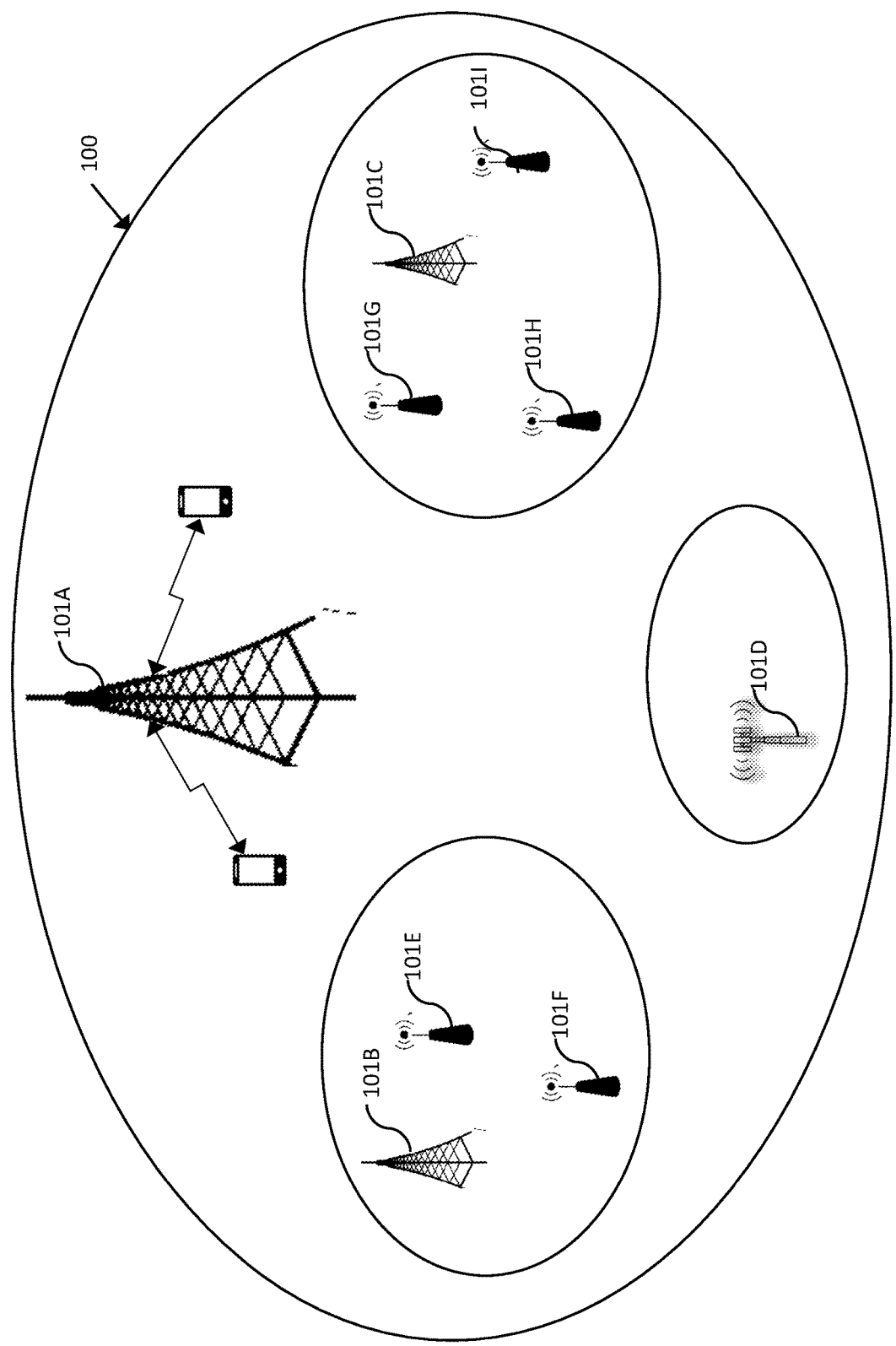
FIG. 1 illustrates an exemplary heterogenous network architecture diagram.

The foregoing shall be more apparent from the following more detailed description of the disclosure.

DETAILED DESCRIPTION OF THE EXEMPLARY EMBODIMENTS

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a sequence diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.'

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As utilized herein, terms "component," "system," "platform," "node," "layer," "selector," "interface," and the like are intended to refer to a computer-related entity, hardware, software (e.g., in execution), and/or firmware. For example, a component can be a process running on a processor, a processor, an object, an executable, a program, a storage device, and/or a computer. By way of illustration, an application running on a server and the server can be a component. One or more components can reside within a process and a component can be localized on one computer and/or distributed between two or more computers.

Moreover, terms like "source and/or destination user device (UE)", "mobile station", "smart computing device", "user device", "user device", "device", "smart mobile communications device", "mobile communication device", "mobile device", "mobile subscriber station," "access terminal," "terminal," "handset," "originating device," "terminating device," and similar terminology refers to any electrical, electronic, electro-mechanical computing device or equipment or a combination of one or more of the above devices. Smart computing devices may include, but not limited to, a mobile phone, smartphone, virtual reality (VR) devices, augmented reality (AR) devices, pager, laptop, a general-purpose computer, desktop, personal digital assistant, tablet computer, mainframe computer, or any other computing device as may be obvious to a person skilled in the art. In general, a smart computing device is a digital, user-configured, computer networked device that can be operated autonomously. A smart computing device is one of the appropriate systems for storing data and other private/sensitive information. The smart computing device operates at all the seven levels of ISO reference model, but the primary function is related to the application layer along with the network, session and presentation layer. The smart computing device may also have additional features of a touch screen, apps ecosystem, physical and biometric security, etc. Further, a 'smartphone' is one type of "smart computing device" that refers to the mobility wireless cellular connectivity device that allows end users to use services on cellular networks such as including but not limited to 2G, 3G, 4G, 5G and/or the like mobile broadband internet connections with an advanced mobile operating system which combines features of a personal computer operating system with other features useful for mobile or handheld use. These smartphones can access the Internet, have a touchscreen user interface, can run third-party apps including capability of hosting online applications, music players and are camera phones possessing high-speed mobile broadband 4G LTE internet with video calling, hotspot functionality, motion sensors, mobile payment mechanisms and enhanced security features with alarm and alert in emergencies. Mobility devices may include smartphones, wearable devices, smart-watches, smart bands, wearable augmented devices, etc. For the sake of specificity, the mobility device is referred to both feature phone and smartphones in present disclosure but does not limit the scope of the disclosure and may extend to any mobility device in implementing the technical solutions. The above smart devices including the smartphone as well as the feature phone including IoT devices enable the communication on the devices. Further, the foregoing terms are utilized interchangeably in the subject specification and related drawings.

Furthermore, the terms "user," "subscriber," "customer," "consumer," "owner," and the like are employed interchangeably throughout the subject specification and related drawings, unless context warrants particular distinction(s) among the terms. It should be appreciated that such terms can refer to human entities, or automated components supported through artificial intelligence, e.g., a capacity to make inference based on complex mathematical formulations, that can provide simulated vision, sound recognition, decision making, etc. In addition, the terms "wireless network" and "network" are used interchangeable in the subject application, unless context warrants particular distinction(s) among the terms.

As used herein, a "processor" or "processing unit" includes one or more processors, wherein processor refers to any logic circuitry for processing instructions. A processor may be a general-purpose processor, a special-purpose processor, a conventional processor, a digital signal processor, a plurality of microprocessors, one or more microprocessors in association with a DSP core, a controller, a microcontroller, a low-end microcontroller, Application Specific Integrated Circuits, Field Programmable Gate Array circuits, any other type of integrated circuits, etc. The processor may perform signal coding data processing, input/output processing, and/or any other functionality that enables the working of the system according to the present disclosure. More specifically, the processor or processing unit is a hardware processor.

FIG. 1 illustrates an exemplary block diagram representation of a heterogenous communication network architecture [100]. Referring to FIG. 1 illustrates an exemplary block diagram representation of a heterogenous communication network architecture [100], in accordance with exemplary embodiments of the present invention. As shown in FIG. 1, the heterogenous wireless communication network [100] comprises of a macro base station [101A] wide area overlay mobility coverage, and one or more micro base station [101B, 101C] further connected to Wi-Fi access points [101E, 101F, 101G, 101H, 101I], and a micro base station [101D] with built-in Wi-Fi access point capability.

Figure 2:
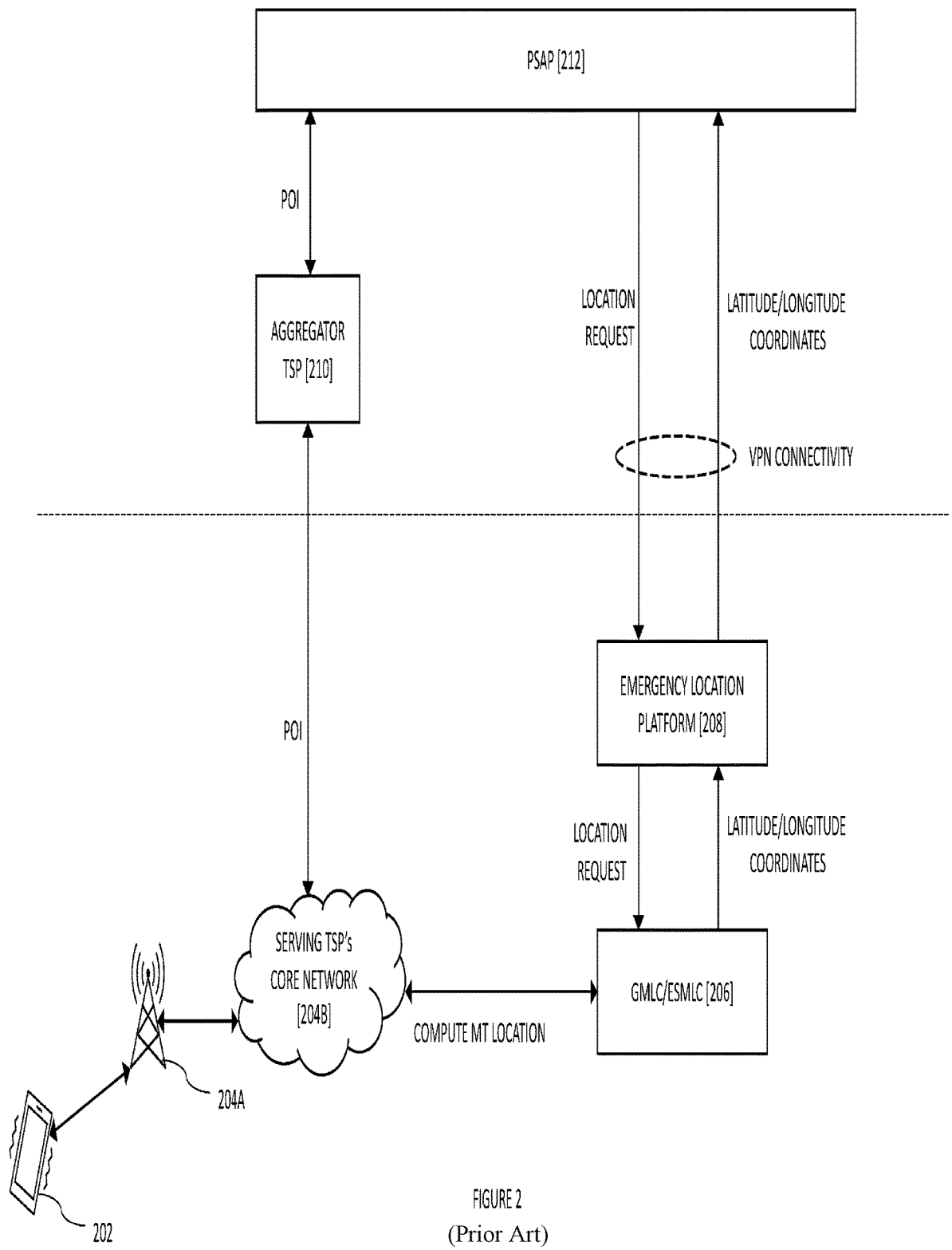
FIG. 2 illustrates an existing solution for providing location of an emergency caller to a PSAP.

Referring to FIG. 2 illustrates an existing solution for providing location of an emergency caller to a PSAP [212]. The PSAP [212] establishes a POI with an aggregator TSP [210] from which all emergency calls are received and routed. Once the call is received by the PSAP [212] emergency center executive, the PSAP [212] performs an MNP dip to identify the home operator of the emergency caller. The PSAP [212] initiates a MT location query to operator over VPN connectivity. In case of IP network TSP, this is a standard MLP request as defined in 3GPP specifications. The TSPs [204] have deployed Emergency Location Platforms [208], which receives these location requests from PSAPs [212] over MLP, interface. The Emergency Location Platforms [208] then queries the GMLC [206] to get the location coordinates. The GMLC [206] using standard MT location query protocol gets the location of the given IMSI/MSISDN by using location methods like AGPS, OTDOA, UL-ECID or Cell ID. This is then routed back to PSAP [212] by the Emergency Location Platform [208]. The PSAP [212] then plots this on the screen of the executive who is able to view it on map and address the emergency call along. Additionally, the PSAP [212] also extracts the subscriber related information from their local subscriber database, which is received periodically from all TSPs [204]. However, it has been observed that the time instance of receiving an emergency call and requesting location may have latency due to system or network issues in the existing solution, thus, leading to failure in location query as well as deviation between the received location coordinates versus the actual location of the emergency caller. Also, the subscriber information, which is periodically shared with PSAP [212] by TSPs [204] may not be the latest updated one. The PSAP needs to query separate subscriber database and pull this information for each emergency call.

Thus, in order to resolve the above highlighted and other inherent limitations in the existing solutions, the present invention provides a system and a method for automatically identifying a location of the emergency caller and to route the emergency call to a PSAP. The solution of the present invention provides that upon receiving an emergency call from a user device, a current location of the user device is determined. Based on the current location of the user device, a serving cell identifier is detected, and a PSAP associated with serving cell identifier is selected. Furthermore, a subscriber information associated with the user device is obtained from a subscriber database. Accordingly, the current location and the subscriber information for the user device along with the emergency call transmitted to the PSAP.

Hereinafter, exemplary embodiments of the present disclosure will be described in detail with reference to the accompanying drawings so that those skilled in the art can easily carry out the present disclosure.

Figure 3:
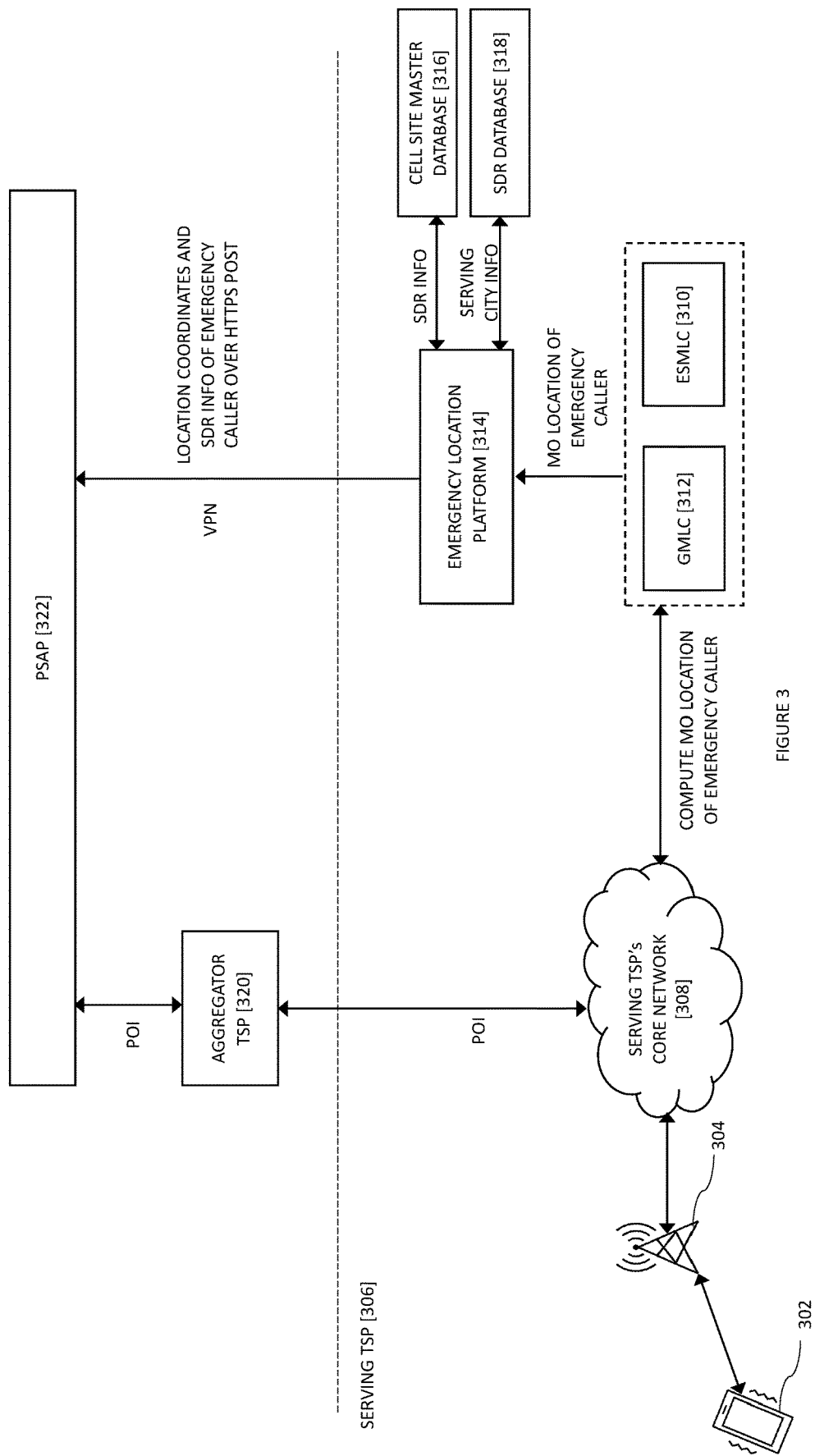
FIG. 3 illustrates an exemplary block diagram of system for routing emergency call to a PSAP, in accordance with exemplary embodiments of the present invention.

Referring to FIG. 3 illustrates an exemplary block diagram of system for routing emergency call to a PSAP, in accordance with exemplary embodiments of the present invention. The system comprises at least one user device [302], an eNodeB [304], an Evolved Serving Mobile Location Center (ESMLC) [310], a Gateway Mobile Location Center (GMLC) [312], an emergency location platform [314] and at least one PSAP [322], all the components connected to each other in a heterogenous network unless otherwise indicated and work in conjunction to achieve the objects of the present invention. In an instance of the present invention, the heterogenous network may be a wired network, a wireless network, or a combination thereof. The heterogenous network may be a single network or a combination of two or more networks.

The eNodeB [304] is configured to receive an emergency call request from at least one user device [302]. The present invention encompasses that, in an instance, the emergency call request comprises one of an emergency Access Point Name (APN), an IMSI and a MSISDN. The present invention encompasses that the at least one user device [302] is attached to the eNodeB [304] on a non-access network channel, and the emergency call is transmitted by the at least one user device [302] to the eNodeB [304] on a SWu interface. For example, whenever a user dials an emergency number for example, 112, etc. the user device [302] initiates an emergency APN. As soon as the eNodeB [304] receives the emergency call, it initiates a location computation request (MO location) for the user device [302] to the ESMLC [310] based on the emergency APN in the emergency call request. In an instance of the present invention, the emergency call request is received at a Mobile Management Entity (MME), and the MME initiates the location computation request (MO location) to the ESMLC [310].

The present invention also encompasses that the eNodeB [304] is further configured to continuously receive a logging information from the at least one user device [302]. The logging information comprises of details of the at least one user device [302] including but not limited to a time of a logging event, a location of the at least one user device [302], at least one audio input of sound from a mic of the at least one user device [302], at least one visual input of a surrounding from a camera of the at least one user device [302], at least one measurement data from one or more sensors of the at least one user device [302]. The eNodeB [304] if further configured to automatically push at least one advertisement on the at least one user device [302] based on the logging information. For example, basis a time and a location of the at least one user device [302], the eNobeB [304] pushes information about critical services such as ambulance service providers, hospitals, medical stores, any ancillary emergency needs situated near the received location of the at least one user device [302]. In another example, basis the at least one visual input, the eNodeB [304] pushes information about critical service, say, an ambulance service providers, hospitals, medical stores, fire services, any ancillary emergency needs, etc. based on an analysis of the at least one visual input.

The present invention further encompasses that the emergency location platform [314] is configured to transmit a request for sharing location to one or more other devices associated with the one or more emergency contacts. In response to said request, the emergency location platform [314] receives locations from the one or more other devices of the one or more emergency contacts. The emergency location platform [314] is also configured to determine at least one other device from the one or more other devices in a close proximity to the at least one user device [302] based on a comparison of the locations of the one or more devices and the current location information of the at least one user device. In another instance, the present invention encompasses that the emergency location platform [314] determines the at least one other device from the one or more other devices in a close proximity to the at least one user device [302] based on a comparison of the locations of the one or more devices and the logging information received from the at least one user device. The emergency location platform [314] is also configured to transmit an emergency notification to the at least one other device, wherein the emergency notification further comprises of the current location information of the at least one user device by. For example, a user enlists at least a brother and a sister as one or more emergency contacts, the emergency location platform [314] requests the location from the devices of the brother and the sister. The emergency location platform [314] determines at least one of the one or more emergency contacts in close proximity of the location of the user device [302] and sends an emergency notification to the other device of the one or more emergency contacts.

The ESMLC [310] is configured to receive a location computation request from the eNodeB [304]. The ESMLC [310] is configured to compute a current location information of the at least one user device [302] based on the emergency call request. The present invention encompasses that the ESMLC [310] is configured to compute the current location information of the at least one user device [302] based on one of Assisted-GPS AGPS, Observed Time Difference of Arrival (OTDOA) and Enhanced Cell ID (UL-ECID). The present invention encompasses that the current location information comprises of a latitude information, a longitude information, a SIM identifier and a transaction ID. The ESMLC [310] is further configured to provide the current location information to the GMLC [312] and the emergency location platform [314]. In another instance, the present invention encompasses that the ESMLC [310] provides the current location information to the MME which further provides the current location information to the GMLC [312].

The GMLC [312] is configured to identify a serving cell identifier for the at least one user device [302] based on the current location. The GMLC [312] is further configured to provide the serving cell identifier to the emergency location platform [314]. In another instance, the present invention encompasses that the GMLC [312] and the ESMLC [310] coexist as one entity, and accordingly the singular entity GMLC [312]/ESMCL [310] is configured to provide the independent working of the GMLC [312] and ESMLC [310]. Thus, the GMLC [312]/ESMLC [310] is configured to provide the current location information and the serving cell identifier to the emergency location platform [314].

The emergency location platform [314] is configured to receive at least one of the current location information and the serving cell identifier from one of the GMLC [312] and the ESMLC [310]. The emergency location platform [314] is configured to identify at least one PSAP [322] for the at least one user device [302] in a cell site master database [316] based on the serving cell identifier. The present invention encompasses that the cell site master database [316] comprises of a correlation of a plurality of cell identifiers with at least one city and at least one PSAP [322]. In an instance, the present invention encompasses that the emergency location platform [314] is configured to identify a serving city based on a comparison of the identified serving cell with the plurality of cell identifiers, and to determine the at least one PSAP [322] associated with the identified serving city based on a successful match in the cell site master database [316]. Table 1 below illustrates an exemplary cell site master database [316]. As shown in the Table 1 below, a given PSAP [322] is mapped against each city, wherein the PSAP [322] is configured to provide the emergency services.

| Cell_ID | SAP_ID | City | Circle Code | State Code | PSAP [322] | Delivery Mode |
|---|---|---|---|---|---|---|
| 405863290135 | I-MP-DMOH-ENB-7084 | Damoh | MP | MP | PSAP [322]-1: MP100 | XML |
|  |  |  |  |  | PSAP [322]-2: Bhopal Police | XML |
| 405863508535 | I-MP-MANO-ENB-9001 | Manora | MP | CG | PSAP [322]-1: CG100 | XML |

The emergency location platform [314] is further configured to extract one or more parameters for the at least one user device [302] from a subscriber information database [318] based on the emergency call request. The present invention encompasses that the subscriber information database [318] comprises of a correlation of one or more MSISDNs with one or more parameters. In an instance, the present invention encompasses that extracting the one or more parameters for the at least one user device [302] is based on a comparison of the MSISDN with the one or more MSISDNs. The present invention encompasses that the one or more parameters comprises of a name, an age, a gender, an address, an one or more emergency contacts and a relative's name. Table 2 below illustrates an exemplary subscriber information database [318].

| SI No | Parameter | Data type/ Allowed Values | Description | Remarks |
|---|---|---|---|---|
| 1. | mobileNo | Long | SIM Number | Location Info |
| 2. | latitude | double | Current latitude | Location Info |
| 3. | longitude | double | Current Longitude | Location Info |
| 4. | callerName | String | Name of Caller | SDR Info |
| 5. | callerAddress | String | Address | SDR Info |
| 6. | callerState | String | State | SDR Info |
| 7. | age | Integer | Age | SDR Info |
| 8. | gender | String | Gender | SDR Info |
| 9. | alternateNo | Long | Alternate Contact No | SDR Info |
| 10. | FATHER_HUS-BAND_NAME | String | Name of Caller's Father/Husband | SDR Info |
| 11. | Trans id/ Trace id | Long | Transaction ID | Location Info |

The emergency location platform [314] is also configured to provide at least one of the current location information and the one or more parameters to the identified at least one PSAP [322] on an access network channel. The present invention encompasses that the current location information and the one or more parameters are combined to generate a https message and said https message is provided to the identified at least one PSAP [322]. The emergency location platform [314] is also configured to route the emergency call to the identified at least one PSAP [322].

The at least one PSAP [322] is also configured to receive at least one of the current location information and the one or more parameters from the emergency location platform [314]. In another instance, the present invention encompasses that the at least one PSAP [322] is also configured to receive the emergency call from the emergency location platform [314]. With availability of the received information at the PSAP [322], an executive at the PSAP [322] will be able to seamlessly view the location of the user device [302] from where the emergency call originated as well as the personal information of the user of the user device [302] while handling the emergency call.

In another instance of the present invention, the at least one PSAP [322] is also configured to transmit a location request for the at least one user device [302] to the emergency location platform [314]. The at least one PSAP [322] is configured to transmit the location request for the at least one user device [302] in an event of a failure to receive the current location information of the at least one user device [302]. The at least one PSAP [322] is also configured to transmit the location request for the at least one user device [302] in order to retrieve the current location of the at least one user device [302], say if there's a change in location of the user device [302]. The emergency location platform [314] is configured to transmit the request for location of the at least one user device [302] to the ESMLC [310]. The ESMLC [310] is further configured to recompute the updated location information of the at least one user device [302]. The emergency location platform [314] is further configured to extract the one or more parameters for the at least one user device [302] from the subscriber information database [318] based on the emergency call request. The emergency location platform [314] is further configured to provide at least one of the updated location information and the one or more parameters to the identified at least one PSAP [322].

Figure 4:
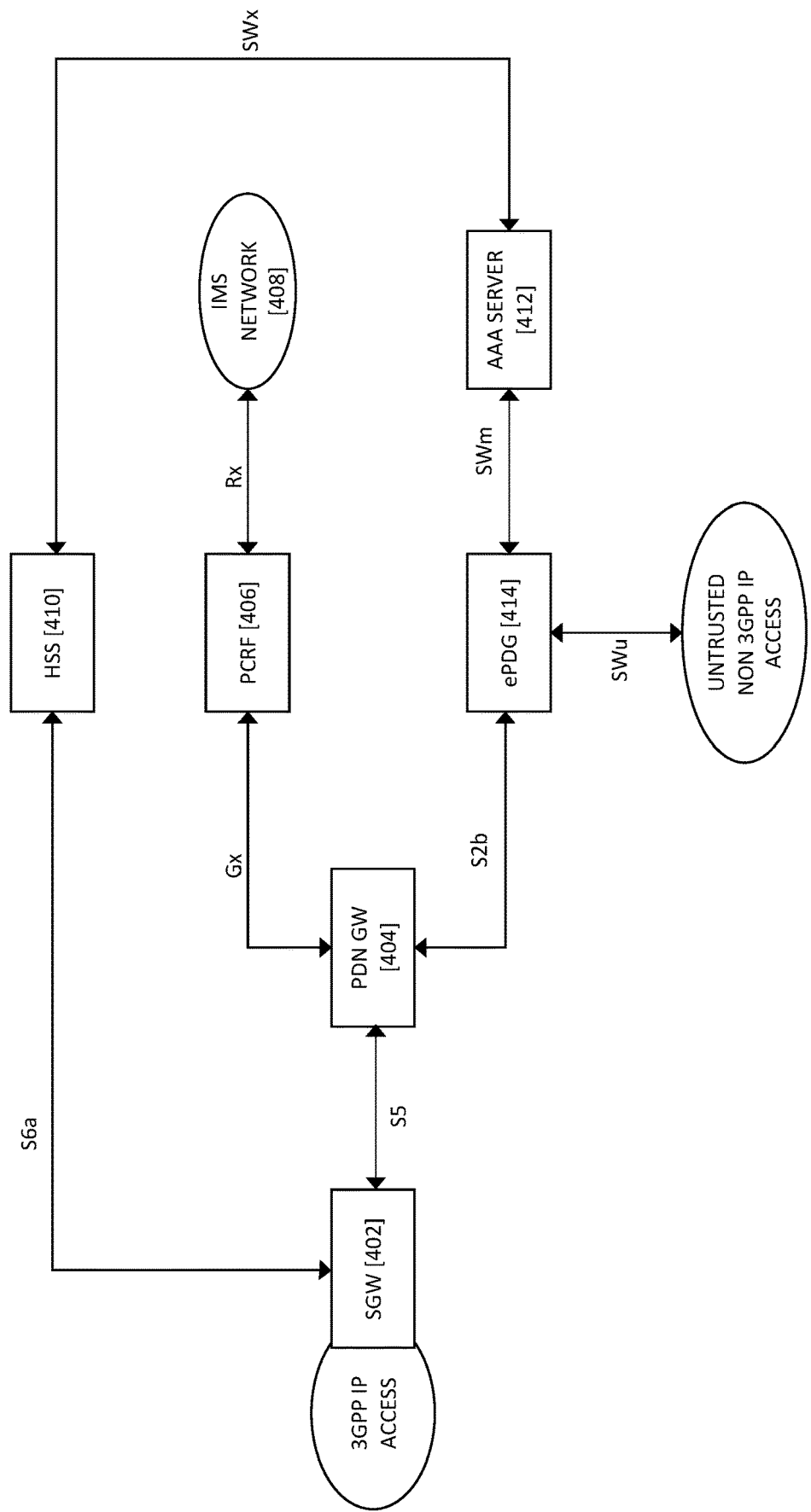
FIG. 4 illustrates an exemplary high level architecture diagram of a heterogenous network architecture, in accordance with exemplary embodiments of the present invention.

Referring to FIG. 4 illustrates an exemplary high level architecture diagram of a heterogenous network architecture, in accordance with exemplary embodiments of the present invention. The heterogenous network architecture comprises of a Signalling Gateway Function (SGW) [402], a Home Subscriber Server (HSS) [410], a Policy and Charging Rules Function (PCRF) [406], a Packet data Network Gateway (PDN-GW or PGW) [404], an Evolved Packet Data Gateway (ePDG) [414], an Authentication-Authorization-Accounting (AAA) server [412] and an IP Multimedia Core Network Subsystem (IMS) network [408], said components are connected via logical interfaces as also indicated in FIG. 4, and as explained below. In another instance, the present invention encompasses that the GMLC [312] is integrated with the HSS [410]. In another instance, the present invention encompasses the emergency location platform [112] is located outside the core network.

Figure 5:
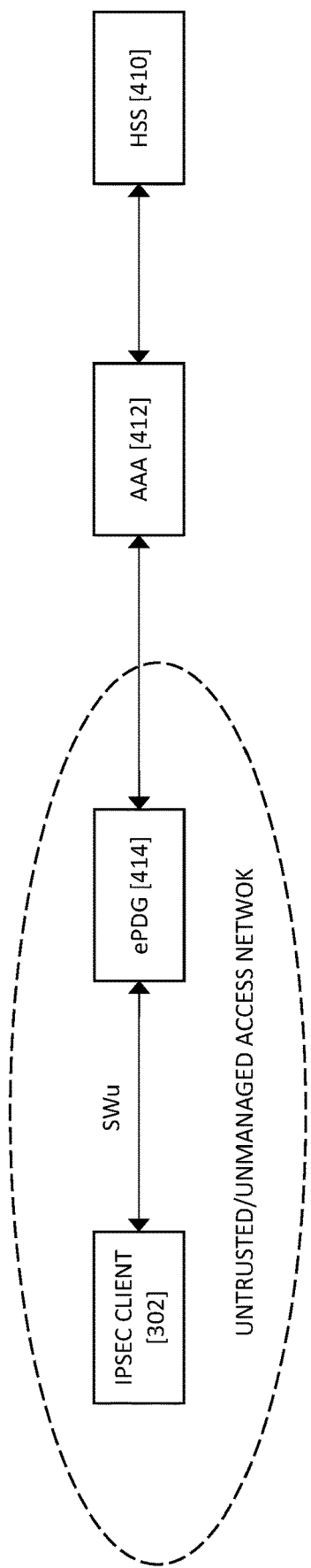
FIG. 5 illustrates an exemplary logical interface SWu of the heterogenous network architecture, in accordance with exemplary embodiments of the present invention.

Referring to FIG. 5 illustrates an exemplary logical interface SWu of the heterogenous network architecture, in accordance with exemplary embodiments of the present invention. SWu is a secure interface between an IPSec client (e.g., a user device [302]) and the ePDG [414] in a non-3GPP access network, say an untrusted and unmanaged network. The SWu interface carries IPSec tunnels. The IKEv2 protocol is used to establish IPSec tunnels between the user devices [302] and ePDG [414].

Figure 6:
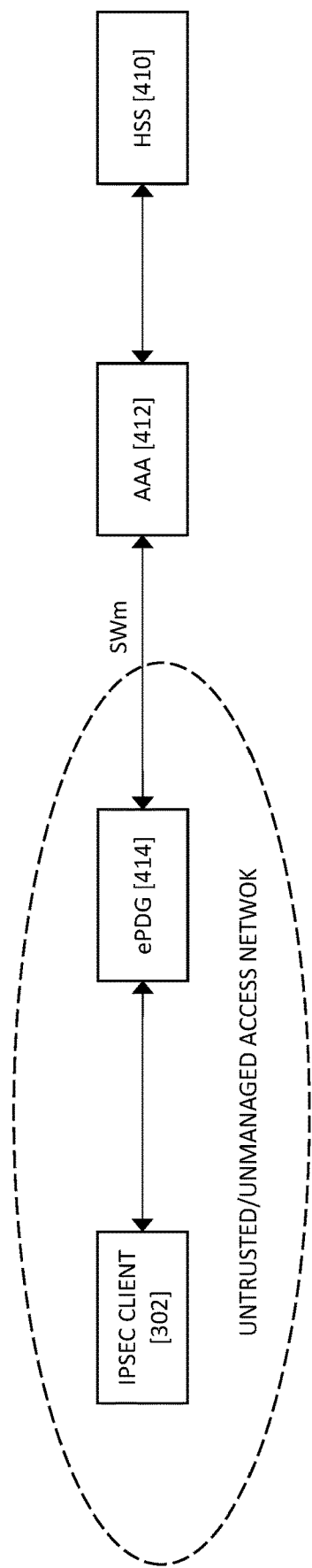
FIG. 6 illustrates an exemplary logical interface SWm of the heterogenous network architecture, in accordance with exemplary embodiments of the present invention.

Referring to FIG. 6 illustrates an exemplary logical interface SWm of the heterogenous network architecture, in accordance with exemplary embodiments of the present invention. SWm is the interface used to connect to the ePDG [414] with the AAA server [412]. It is used to transport mobility parameters for the connected IPSec clients (e.g., user devices [302]) and the tunnel's authentication and authorization data using EAP-AKA method.

Figure 7:
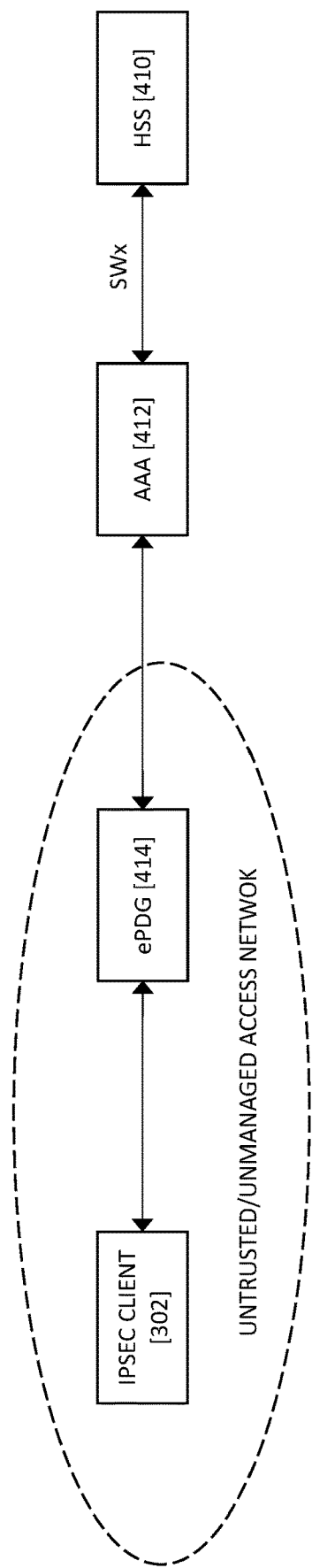
FIG. 7 illustrates an exemplary logical interface SWx of the heterogenous network architecture, in accordance with exemplary embodiments of the present invention.

Referring to FIG. 7 illustrates an exemplary logical interface SWx of the heterogenous network architecture, in accordance with exemplary embodiments of the present invention. SWx is the interface used to connect the AAA server [412] to the HSS [410]. It is used to transport mobility parameters of the IPSec clients (e.g., user devices [302]) and fetch user authorization data.

Figure 8:
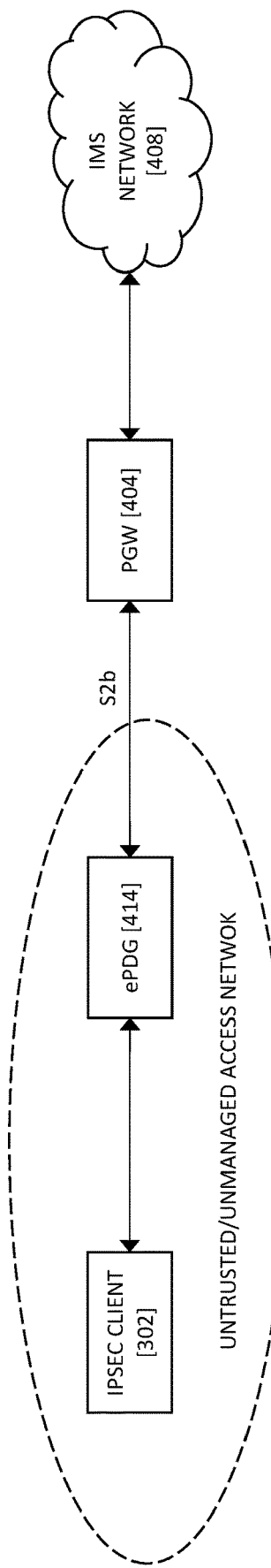
FIG. 8 illustrates an exemplary logical interface S2b of the heterogenous network architecture, in accordance with exemplary embodiments of the present invention.

Referring to FIG. 8 illustrates an exemplary logical interface S2b of the heterogenous network architecture, in accordance with exemplary embodiments of the present invention. S2b is the interface used to connect the PGW [404] to the IMS network [408]. It is based on GTPv2 protocol and used to establish WLAN sessions for the IPSec clients (e.g., user device [302]).

Figure 9:
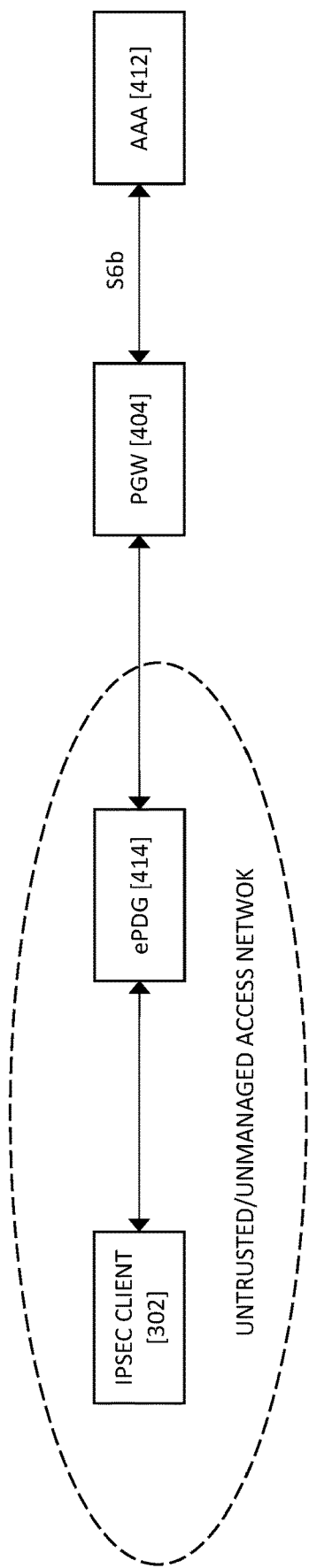
FIG. 9 illustrates an exemplary logical interface S6b of the heterogenous network architecture, in accordance with exemplary embodiments of the present invention.

Referring to FIG. 9 illustrates an exemplary logical interface S6b of the heterogenous network architecture, in accordance with exemplary embodiments of the present invention. S6b is the interface used to connect the AAA server [412] to the PGW [404]. It is used to update the PGW [404] address to the HSS [410], when the IPSec client (e.g., user device [302]) is attached on non-3GPP access.

Figure 10:
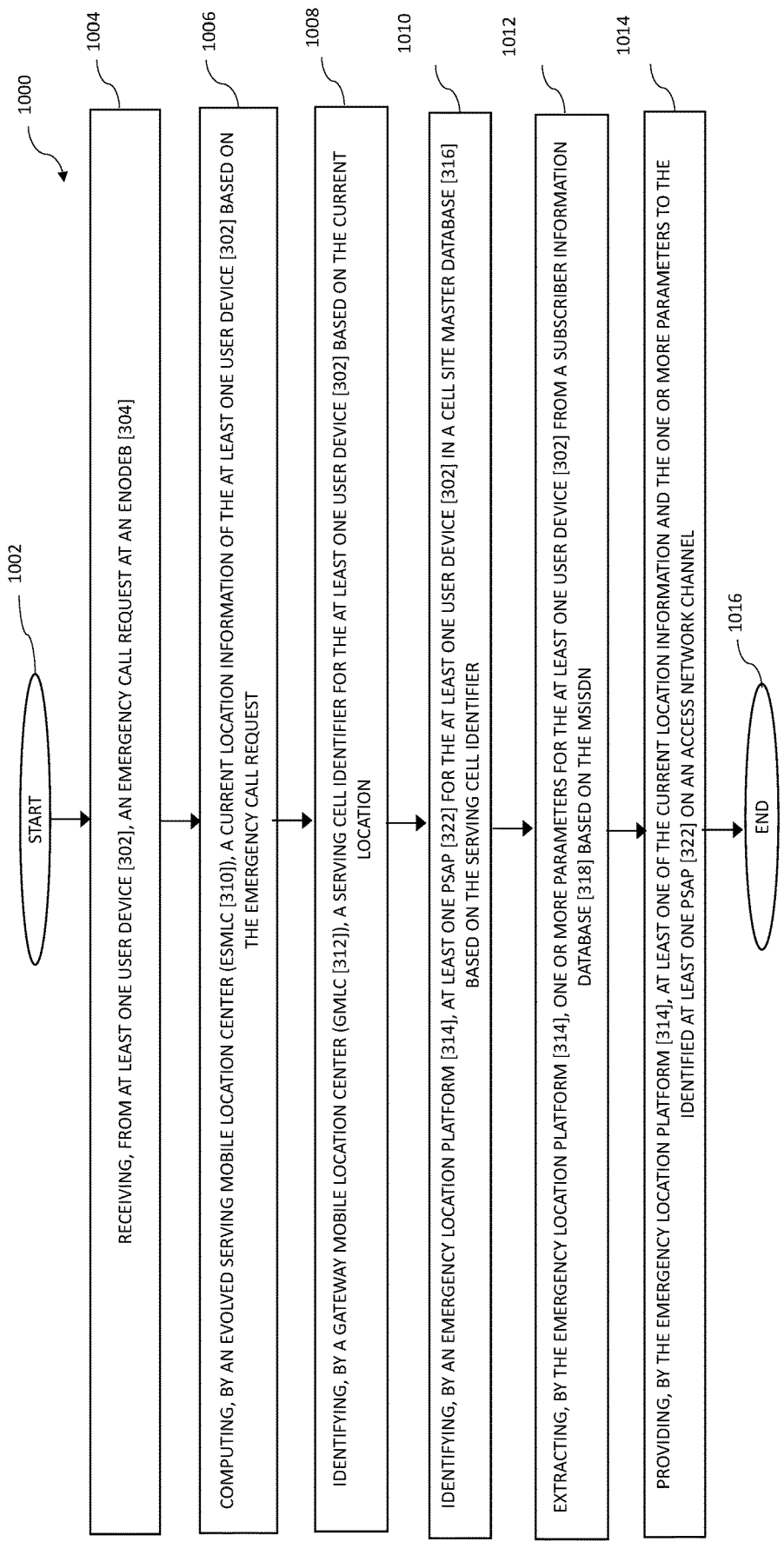
FIG. 10 illustrates an exemplary method flow diagram depicting a method for routing an emergency call to a PSAP, in accordance with exemplary embodiments of the present invention.

Referring to FIG. 10 illustrates an exemplary method flow diagram depicting a method for routing an emergency call to a PSAP [322], in accordance with exemplary embodiments of the present invention. The method starts at step [1002]. At step [1004], receiving an emergency call request from the at least one user device [302] at an eNodeB [304]. The present invention encompasses that the emergency call request comprises one of an emergency APN, an IMSI and a MSISDN. The present invention encompasses that the at least one user device [302] is attached to the eNodeB [304] on a non-access network channel, and the emergency call is transmitted by the at least one user device [302] to the eNodeB [304] on a SWu interface. For example, whenever a user dials an emergency number for example, 112, etc. the user device [302] initiates an emergency APN. As soon as the eNodeB [304] receives the emergency call, it initiates a location computation request (MO location) for the user device [302] to the ESMLC [310] based on the emergency APN in the emergency call request. In an instance of the present invention, the emergency call request is received at a Mobile Management Entity (MME), and the MME initiates the location computation request (MO location) to the ESMLC [310].

At step [1006], the ESMLC [310] computes a current location information of the at least one user device [302] based on the emergency call request. The present invention encompasses that the ESMLC [310] is configured to compute the current location information of the at least one user device [302] based on one of Assisted-GPS AGPS, Observed Time Difference of Arrival (OTDOA) and Enhanced Cell ID (UL-ECID). The present invention encompasses that the current location information comprises of a latitude information, a longitude information, a SIM identifier and a transaction ID. The ESMLC [310] provides the current location information to the GMLC [312] and the emergency location platform [314]. In another instance, the present invention encompasses that the ESMLC [310] provides the current location information to the MME which further provides the current location information to the GMLC [312].

At step [1008], the GMLC [312] identifies a serving cell identifier for the at least one user device [302] based on the current location. The GMLC [312] is provides the serving cell identifier to the emergency location platform [314]. Next, at step [1010], the emergency location platform [314] identifies at least one PSAP [322] for the at least one user device [302] in a cell site master database [316] based on the serving cell identifier. The present invention encompasses that the cell site master database [316] comprises of a correlation of a plurality of cell identifiers with at least one city and at least one PSAP [322]. In an instance, the present invention encompasses that the emergency location platform [314] is configured to identify a serving city based on a comparison of the identified serving cell with the plurality of cell identifiers, and to determine the at least one PSAP [322] associated with the identified serving city based on a successful match in the cell site master database [316]. Table 1 below illustrates an exemplary cell site master database [316]. As shown in the Table 1 below, a given PSAP [322] is mapped against each city, wherein the PSAP [322] is configured to provide the emergency services.

| Cell_ID | SAP_ID | City | Circle Code | State Code | PSAP [322] | Delivery Mode |
|---|---|---|---|---|---|---|
| 405863290135 | I-MP-DMOH-ENB-7084 | Damoh | MP | MP | PSAP [322]-1: MP100 | XML |
| | | | | | PSAP [322]-2: Bhopal Police | XML |

-continued

| Cell_ID | SAP_ID | City | Circle Code | State Code | PSAP [322] | Delivery Mode |
|---|---|---|---|---|---|---|
| 405863508535 | I-MP-MANO-ENB-9001 | Manora | MP | CG | PSAP [322]-1: CG100 | XML |

Subsequently, at step [1012], the emergency location platform [314] extracts one or more parameters for the at least one user device [302] from a subscriber information database [318] based on the emergency call request. The present invention encompasses that the subscriber information database [318] comprises of a correlation of one or more MSISDNs with one or more parameters and extracting the one or more parameters for the at least one user device [302] is based on a comparison of the MSISDN with the one or more MSISDNs. The present invention encompasses that the one or more parameters comprises of a name, an age, a gender, an address, an one or more emergency contacts and a relative's name. Table 2 below illustrates an exemplary subscriber information database [318].

| SI No | Parameter | Data type/ Allowed Values | Description | Remarks |
|---|---|---|---|---|
| 1. | mobileNo | Long | SIM Number | Location Info |
| 2. | latitude | double | Current latitude | Location Info |
| 3. | longitude | double | Current Longitude | Location Info |
| 4. | callerName | String | Name of Caller | SDR Info |
| 5. | callerAddress | String | Address | SDR Info |
| 6. | callerState | String | State | SDR Info |
| 7. | age | Integer | Age | SDR Info |
| 8. | gender | String | Gender | SDR Info |
| 9. | alternateNo | Long | Alternate Contact No | SDR Info |
| 10. | FATHER_HUSBAND_NAME | String | Name of Caller's Father/Husband/Emergency Caller | SDR Info |
| 11. | Trans id/ Trace id | Long | Transaction ID | Location Info |

At step [1014], the emergency location platform [314] provides at least one of the current location information and the one or more parameters to the identified at least one PSAP [322] on an access network channel. The present invention encompasses that the current location information and the one or more parameters are combined to generate a https message and said https message is provided to the identified at least one PSAP [322]. The emergency location platform [314] is also configured to route the emergency call to the identified at least one PSAP [322]. The method completes at step [1016].

The method of the present invention encompasses that the at least one PSAP [322] receives at least one of the current location information and the one or more parameters from the emergency location platform [314]. In another instance, the present invention encompasses that the at least one PSAP [322] is also configured to receive the emergency call from the emergency location platform [314].

The method of the present invention further encompasses transmitting, by the identified at least one PSAP [322], a location request for the at least one user device [302] to the emergency location platform [314]. Next, the ESMLC [310] recomputing the updated location information of the at least one user device [302]. Subsequently, the emergency location platform [314] extracts the one or more parameters for the at least one user device [302] from the subscriber information database [318] based on the emergency call request (e.g., MSISDN). Lastly, the emergency location platform [314] provides at least one of the updated location information and the one or more parameters to the identified at least one PSAP [322].

The method of the present invention also encompasses that continuously receiving, at the eNodeB [304], a logging information from the at least one user device [302]. In an instance, the logging information comprises of details of the at least one user device [302] including but not limited to a time of a logging event, a location of the at least one user device [302], at least one audio input of sound from a mic of the at least one user device [302], at least one visual input of a surrounding from a camera of the at least one user device [302], at least one measurement data from one or more sensors of the at least one user device [302]. The method further comprises automatically pushing, by the eNodeB [304], at least one critical service information on the at least one user device [302] based on the logging information. For example, basis a time and a location of the at least one user device [302], the eNobeB [304] pushes information about critical services such as ambulance service providers, hospitals, medical stores, notifying one or more emergency contacts, any other ancillary emergency needs situated near the received location of the at least one user device [302]. In another example, basis the at least one visual input, the eNodeB [304] pushes an information about critical services, say, ambulance service providers, hospitals, medical stores, any ancillary emergency needs, fire brigade, etc. based on an analysis of the at least one visual input.

The method of the present invention further encompasses transmitting, by the emergency location platform [314], a request for sharing location to one or more other devices associated with the one or more emergency contacts. In response to said request, the emergency location platform [314] receives locations from the one or more other devices of the one or more emergency contacts. Subsequently, the emergency location platform [314] determines at least one other device from the one or more other devices in a close proximity to the at least one user device [302] based on a comparison of the locations of the one or more devices and the current location information of the at least one user device. In another instance, the present invention encompasses that the emergency location platform [314] determines the at least one other device from the one or more other devices in a close proximity to the at least one user device [302] based on a comparison of the locations of the one or more devices and the logging information received from the at least one user device. Thereafter, the emergency location platform [314] transmits an emergency notification to the at least one other device, wherein the emergency notification further comprises of the current location information of the at least one user device by. For example, a user enlists at least a brother and a sister as one or more emergency contacts, the emergency location platform [314] requests the location from the devices of the brother and the sister. The emergency location platform [314] determines at least one of the one or more emergency contacts in close proximity of the location of the user device [302], and sends an emergency notification to the other device of the one or more emergency contacts.

Figure 11:
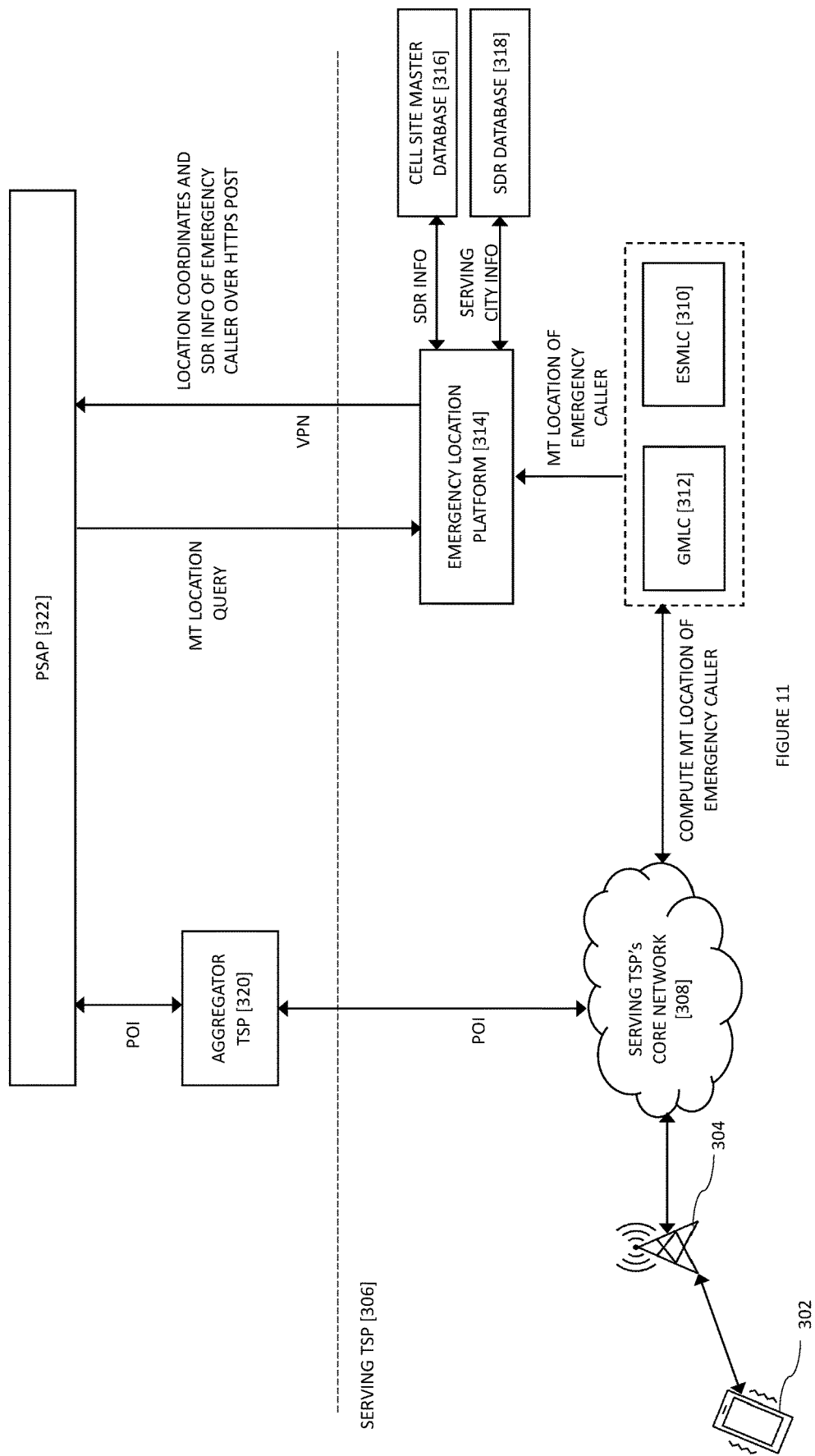
FIG. 11 illustrates another exemplary block diagram of the system for routing emergency call to a PSAP, in accordance with exemplary embodiments of the present invention.

Referring to FIG. 11 illustrates another exemplary block diagram of the system for routing emergency call to a PSAP [322], in accordance with exemplary embodiments of the present invention. In scenarios where due to technical limitations if the current location of the at least one user device [302] could not be received at the at least one identified PSAP [322], or in scenarios where the PSAP [322] needs to retrieve the current location of the at least one user device [302], the at least one identified PSAP [322] sends a location query to the emergency location platform [314]. The emergency location platform [314] instructs the ESMLC [310] to recompute the location of the at least one user device [302]. The present invention encompasses that the ESMLC [310] is recomputes the current location information of the at least one user device [302] based on one of Assisted-GPS AGPS, Observed Time Difference of Arrival (OTDOA) and Enhanced Cell ID (UL-ECID). The ESMLC [310] transmits the computed current location of the at least one user device [302] to the emergency location platform [314]. Subsequently, the emergency location platform [314] extracts the one or more parameters for the at least one user device [302] from the subscriber information database [318] based on the emergency call request (e.g., MSISDN) of the at least user device [302]. Lastly, the emergency location platform [314] provides at least one of the updated location information and the one or more parameters to the identified at least one PSAP [322].

Figure 12:
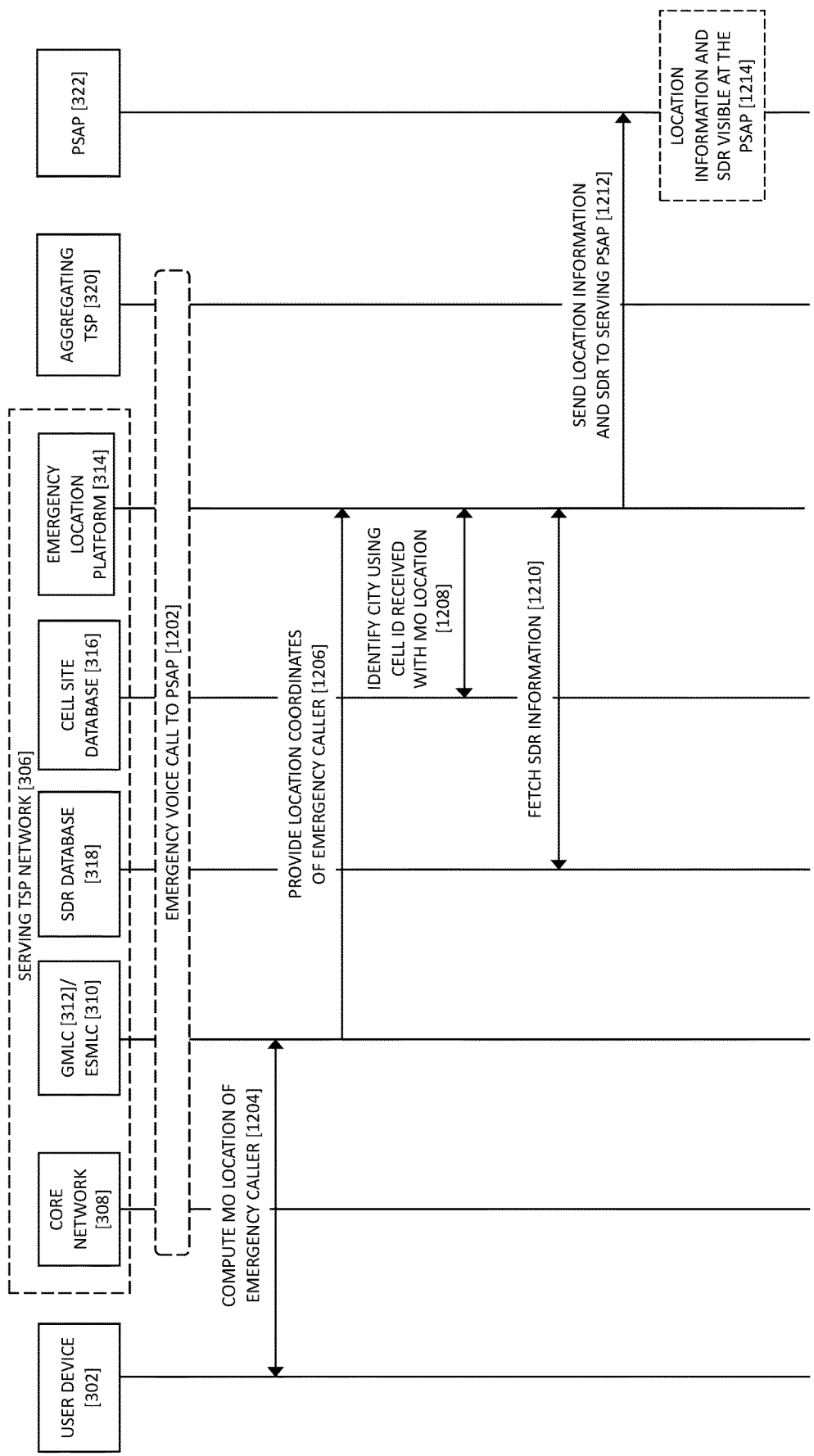
FIG. 12 illustrates an exemplary call flow diagram for routing an emergency call to a PSAP, in accordance with exemplary embodiments of the present invention.

Referring to FIG. 12 illustrates an exemplary call flow diagram for routing an emergency call to a PSAP [322], in accordance with exemplary embodiments of the present invention. At step [1202], whenever a user dials an emergency number for example, 112, etc. the user device [302] initiates an emergency APN. As soon as the eNodeB [304] receives the emergency call, at step [1204], a Mobile Management Entity (MME) initiates the location computation request (MO location) to the ESMLC [310] based on the emergency APN in the emergency call request. At step [1206], the ESMLC [310] computes the current location information of the at least one user device [302] based on one of Assisted-GPS AGPS, Observed Time Difference of Arrival (OTDOA) and Enhanced Cell ID (UL-ECID).

The computed location is provided by the ESMLC [310] to the MME, which further sends the computed location to the GMLC [312]. The GMLC [312] identifies a serving cell identifier for the at least one user device [302] based on the current location. The MME sends the computed location and the serving cell identifier to the emergency location platform [314]. At step [1208], the emergency location platform [314] identifies at least one PSAP [322] for the at least one user device [302] in a cell site master database [316] based on the serving cell identifier. At step [1210], the emergency location platform [314] extracts one or more parameters for the at least one user device [302] from a subscriber information database [318] based on the emergency call request (e.g., MSISDN. At step [1212], the emergency location platform [314] provides at least one of the current location information and the one or more parameters to the identified at least one PSAP [322] on an access network channel. At step [1214], with availability of the received information at the at least one PSAP [322], an executive at the PSAP [322] will be able to seamlessly view the location of the user device [302] from where the emergency call originated as well as the personal information of the user of the user device [302] while handling the emergency call.

Figure 13:
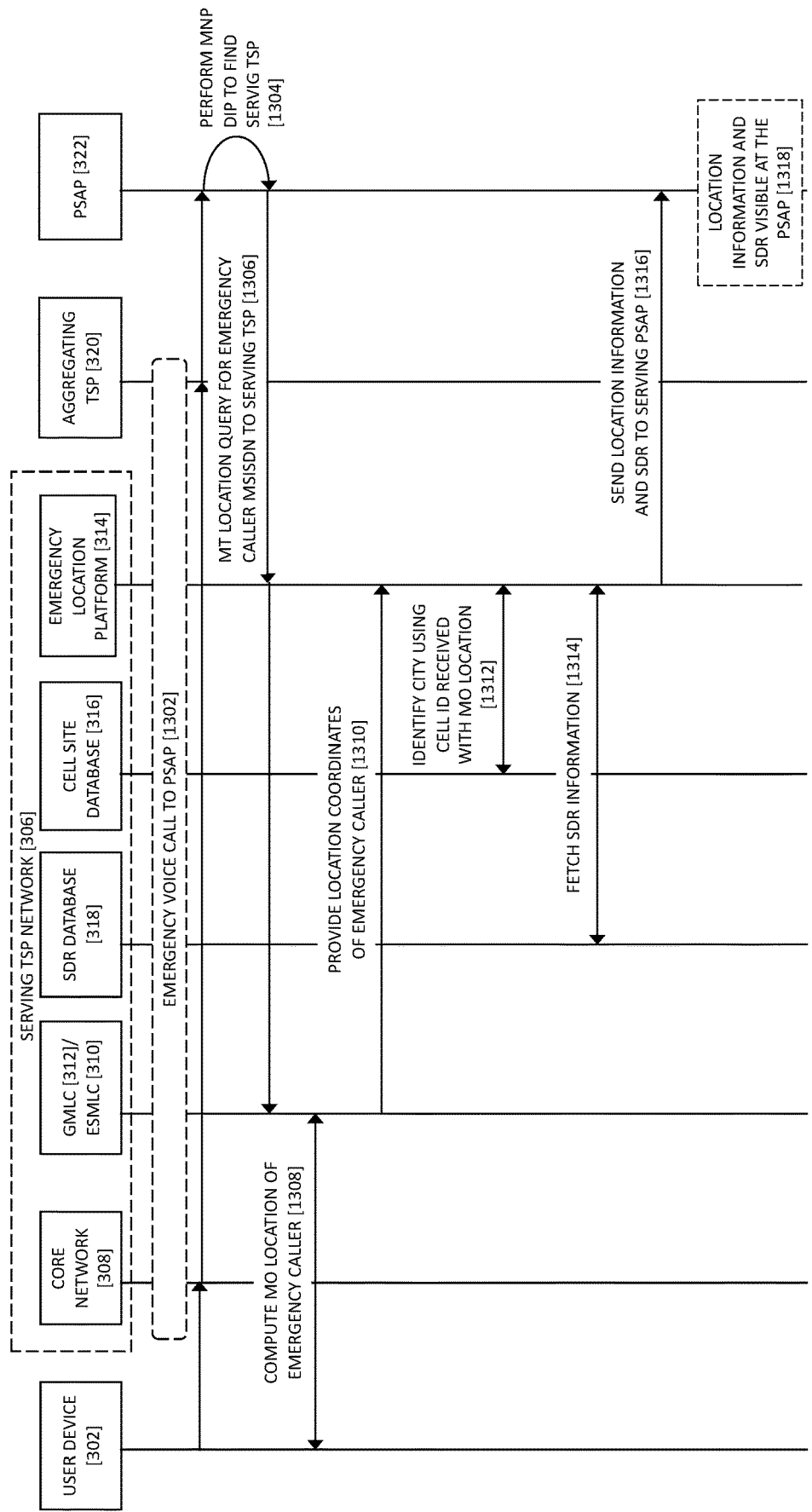
FIG. 13 illustrates an exemplary call flow diagram for routing an emergency call to a PSAP, in accordance with exemplary embodiments of the present invention.

Referring to FIG. 13 illustrates an exemplary call flow diagram for routing an emergency call to a PSAP [322], in accordance with exemplary embodiments of the present invention. At step [1302], whenever a subscriber dials an emergency number (like 112), an emergency call gets routed towards a serving PSAP [322] via an aggregating TSP [320]

in accordance with procedure of FIG. 12. At step [1304], due to any of the technical reasons or if there is a need to fetch location of the emergency caller, the PSAP [322] performs MNP DIP to find the serving TSP [306]. At step [1306], the PSAP [322] initiates a location query towards the identified TSP. At step [1308], the emergency location platform [314] queries the GMLC [312] for the location, and the GLMC computes the location and provides the location coordinate to the emergency location platform [314] at step [1310]. At step [1312], the emergency location platform [314] queries the cell site database to extract the cell identifier of the serving cell. At step [1314], the emergency location platform [314] queries the subscriber information database [318] to extract the SDR information for the at least one user device [302]. At step [1316], the location coordinates along with the SDR information is composed as a single message and sent as https POST to the requesting PSAP [322] along with the location response. At step [1318], with availability of the received information at the at least one PSAP [322], an executive at the PSAP [322] will be able to seamlessly view the location of the user device [302] from where the emergency call originated as well as the personal information of the user of the user device [302] while handling the emergency call.

Figure 14:
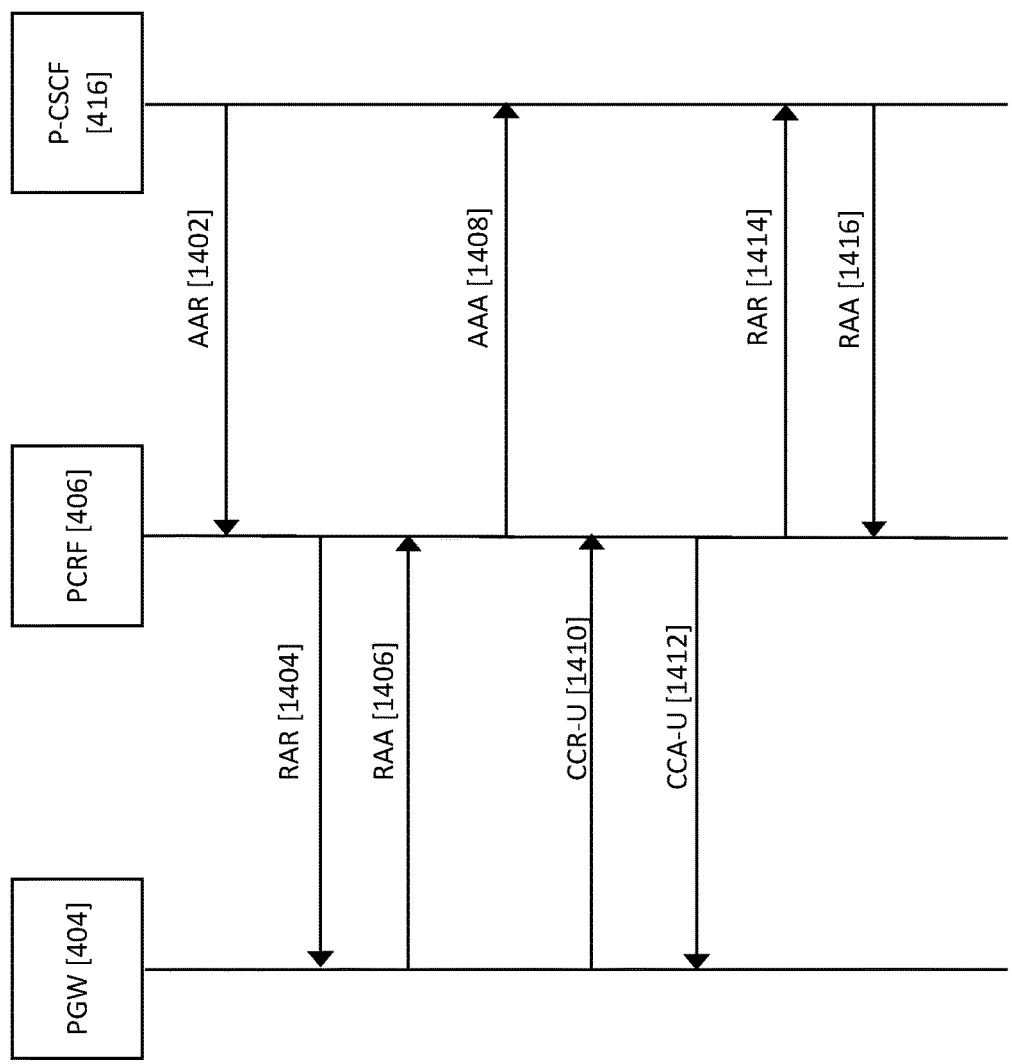
FIG. 14 illustrates an exemplary implementation of the solution of the present invention for VoWiFi users in the Heterogeneous Network, in accordance with exemplary embodiments of the present invention.

Referring to FIG. 14 illustrates an exemplary implementation of the solution of the present invention for Voice-over-Wi-Fi (VoWiFi) users in the Heterogeneous Network, in accordance with exemplary embodiments of the present invention. The scheme of the exemplary implementation comprises of the PGW [404], the PCRF [406] and the Proxy-Call Session Control Function (P-CSCF [416]). At [1402], the P-CSCF [416] sends an AAR message to the PCRF [406] to establish a dedicated bearer for the voice media stream. The AAR message contains the subscriber ID, AF ID, IMS application layer charging ID, and media information (including the media type and media stream description). At [1404], the PCRF [406] sends an RAR message containing the PCC rule to the PGW [404]. The PGW [404] searches for the dedicated bearer based on QCI or ARP in the PCC rule. If no dedicated bearer is found, the PGW [404] creates a dedicated bearer, installs the voice media stream information and the PCC rule in the dedicated bearer, and sends an RAA message to the PCRF [406] at step [1406]. At [1408], the PCRF [406] sends an AAA message to the P-CSCF [416] to indicate that the dedicated bearer is successfully created for the voice media stream. At step [1410], the PGW [404] sends a CCR-U message to the PCRF [406] notifying that the policy charging that the resource is successfully reserved. At step [1412], the PCRF [406] sends a CCA-U message to the PGW [404]. At step [1414], the PCRF [406] sends an RAR message to the P-CSCF [416] indicating that the resource is successfully reserved. At step [1416], the P-CSCF [416] sends an RAA message to the PGW [404].

The present invention also encompasses that the system and the method of the present invention is further provisioned to select (or modify) a mode of collection of location and sensor information from the user device [302] wherein the mode of collection is one of a continuous logging mode and a frequent logging mode. In an instance, the present invention encompasses that the logging information collected from the at least one user device is also sent to a cloud server of the eNodeB [304] triggering a cloud module system which sends the collected information after every fixed interval to the cloud and everyone in the emergency list.

The present invention further encompasses that the system and method provide for routing the locations details of an emergency caller, i.e., the user device [302] to a predefined one or more emergency contacts details as provisioned in the emergency location platform [314]. In another instance the present invention encompasses that the system and the method is used by law enforcement agencies (LEA) for extracting the location and/or SDR details of any mobility subscriber, thus, with appropriate scheduler in the emergency location platform [314], the location information is periodically transmitted to the LEAs. In yet another instance the present invention encompasses that the system and the method provide a collaborative platform and option to choose the "one or more emergency contacts closest person" that allows every subscriber on the list to share their location information when the system is triggered on any one device. This information is used by senders' device to auto-sequence the list based on who is closest to the sender smartphone/device. Also, again the system ensures that all device or smartphones are not alerted simultaneously to avoid deadlock. The recipient smartphone sends location discreetly only in emergency situation for privacy reasons.

The novel solution of the present invention provides a system and a method for routing an emergency call to a public-safety answering point (PSAP [322]) to provides seamless emergency services on 3GPP access network to a user device [302] by a IMS non-compliant PSAP [322]. The solution of the present invention significantly reduces the PSAP [322] response time in providing emergency services to the emergency caller by routing the emergency call to a serving area PSAP [322] and not to the home circle PSAP [322] within the existing deployed EPC Network. Thus, the present invention enables the SIM based subscribers to dial in emergency numbers and avail emergency service facility defined by authorities while registering.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the invention herein, whereby it is to be distinctly understood that the foregoing descriptive matter to be implemented merely as illustrative of the invention and not as limitation.

We claim:

1. A method for routing an emergency call, the method comprising:
 receiving, from at least one user device [302], an emergency call request at an eNodeB [304];
 computing, by an Evolved Serving Mobile Location Center (ESMLC) [310], a current location information of the at least one user device [302] based on the emergency call request;
 identifying, by a Gateway Mobile Location Center (GMLC) [312], a serving cell identifier for the at least one user device [302] based on the current location;
 identifying, by an emergency location platform [314], at least one PSAP [322] for the at least one user device [302] in a cell site master database [316] based on the identified serving cell identifier;
 extracting, by the emergency location platform [314], one or more parameters for the at least one user device [302] from a subscriber information database [318] based on the emergency call request;
 providing, by the emergency location platform [314], at least one of the current location information and the one or more parameters to the identified at least one PSAP [322] on an access network channel.

2. The method as claimed in claim 1, the method further comprising routing, by the emergency location platform [314], the emergency call to the identified at least one PSAP [322].

3. The method as claimed in claim 1, wherein the emergency call request comprises one of an emergency APN, an IMSI and a MSISDN.

4. The method as claimed in claim 1, the method further comprising:

transmitting, by the identified at least one PSAP [322], a location request for the at least one user device [302] to the emergency location platform [314];

recomputing, by the ESMLC [310], the updated current location information of the at least one user device [302];

extracting, by the emergency location platform [314], another one or more parameters for the at least one user device [302] from the subscriber information database [318] based on the emergency call request; and providing, by the emergency location platform [314], at least one of the recomputed location information and the other one or more parameters to the identified at least one PSAP [322].

5. The method as claimed in claim 1, wherein the cell site master database [316] comprises of a correlation of a plurality of cell identifiers with at least one city and at least one PSAP [322], and identifying the at least one PSAP [322] for the at least one user device [302] in a cell site master database [316] further comprises:

identifying a serving city based on a comparison of the identified serving cell identifier with the plurality of cell identifiers; and determining the at least one PSAP [322] associated with the identified serving city.

6. The method as claimed in claim 1, wherein the emergency call request comprises a MSISDN, the subscriber information database [318] comprises of a correlation of one or more MSISDNs with one or more parameters, and extracting the one or more parameters for the at least one user device [302] is based on a comparison of the MSISDN of the emergency call request with the one or more MSISDNs.

7. The method as claimed in claim 1, wherein the one or more parameters comprises of a name, an age, a gender, an address, one or more one or more emergency contacts and a relative's name.

8. The method as claimed in claim 1, wherein the current location information comprises of a latitude information, a longitude information, a SIM identifier and a transaction ID.

9. The method as claimed in claim 1, the method further comprising:

continuously receiving, at the eNodeB [304], a logging information from the at least one user device [302], wherein the logging information is provided along with at least one of the current location information and the one or more parameters by the emergency location platform to the identified at least one PSAP [322]; and pushing, by the eNodeB [304], at least one critical service information on the at least one user device [302] based on the logging information.

10. The method as claimed in claim 7, the method further comprising:

transmitting, by the emergency location platform [314], a request for sharing location to one or more other devices associated with the one or more emergency contacts;

receiving, at the emergency location platform [314], the locations for the one or more other devices of the one or more emergency contacts;

determining, by the emergency location platform [314], at least one other device from the one or more other devices in a close proximity to the at least one user device [302] based on a comparison of the locations of the one or more other devices and the current location information of the at least one user device [302]; and transmitting, to the at least one other device, an emergency notification further comprising of the current location information of the at least one user device [302] by the emergency location platform [314].

11. The method as claimed in claim 1, wherein the at least one user device [302] is attached to the eNodeB [304] on a non-access network channel, and the emergency call is transmitted by the at least one user device [302] to the eNodeB [304] on a SWu interface.

12. The method as claimed in claim 1, wherein the ESMLC [310] computes the current location information of the at least one user device [302] based on one of Assisted-GPS AGPS, Observed Time Difference of Arrival (OTDOA) and Enhanced Cell ID (UL-ECID).

13. The method as claimed in claim 1, wherein the current location information and the one or more parameters are combined to generate a https message, and the https message is provided to the identified at least one PSAP [322].

14. A system for routing an emergency, the system comprising:

an eNodeB [304] configured to receive an emergency call request from at least one user device [302];

an Evolved Serving Mobile Location Center (ESMLC) [310] connected to the eNodeB [304], said ESMLC [310] configured to compute a current location information of the at least one user device [302] based on the emergency call request;

a Gateway Mobile Location Center (GMLC) [312] coupled to the ESMLC [310] and the eNodeB [304], said GMLC [312] configured to identify a serving cell identifier for the at least one user device [302] based on the current location; and an emergency location platform [314] connected to the ESMLC [310] and the GMLC [312], said emergency location platform [314] configured to:

identify at least one PSAP [322] for the at least one user device [302] in a cell site master database [316] based on the identified serving cell identifier, extract one or more parameters for the at least one user device [302] from a subscriber information database [318] based on the emergency call request, and provide at least one of the current location information and the one or more parameters to the identified at least one PSAP [322] on an access network channel.

15. The system as claimed in claim 14, wherein the emergency location platform is further configured to route the emergency call to the identified at least one PSAP [322].

16. The system as claimed in claim 14, wherein the emergency call request comprises one of an emergency APN, an IMSI and a MSISDN.

17. The system as claimed in claim 14, wherein the identified at least one PSAP [322] is further configured to transmit a location request for the at least one user device [302] to the emergency location platform [314];

the ESMLC [310] is further configured to recompute the updated current location information of the at least one user device [302]; and the emergency location platform [314] is further configured to:

extract another one or more parameters for the at least one user device [302] from the subscriber information database [318] based on the emergency call request, and provide at least one of the updated recomputed location information and the other one or more parameters to the identified at least one PSAP [322].

18. The system as claimed in claim 14, wherein the cell site master database [316] comprises of a correlation of a plurality of cell identifiers with at least one city and at least one PSAP [322], and identifying the at least one PSAP [322] for the at least one user device [302] in a cell site master database [316] further comprises:

identifying a serving city based on a comparison of the identified serving cell identifier with the plurality of cell identifiers; and determining the at least one PSAP [322] associated with the identified serving city.

19. The system as claimed in claim 14, wherein the emergency call request comprises a MSISDN, the subscriber information database [318] comprises of a correlation of one or more MSISDNs with one or more parameters, and extracting the one or more parameters for the at least one user device [302] is based on a comparison of the MSISDN of the emergency call request with the one or more MSISDNs.

20. The system as claimed in claim 14, wherein the one or more parameters comprises of a name, an age, a gender, an address, one or more emergency contacts and a relative's name.

21. The system as claimed in claim 14, wherein the current location information comprises of a latitude information, a longitude information, a SIM identifier and a transaction ID.

22. The system as claimed in claim 14, wherein the eNodeB [304] is further configured to:

continuously receive a logging information from the at least one user device [302], wherein the logging information is provided along with at least one of the current location information and the one or more parameters by the emergency location platform [314] to the identified at least one PSAP [322]; and automatically push at least one critical service information on the at least one user device based on the logging information.

23. The system as claimed in claim 20, wherein the emergency location platform [314] is further configured to:

transmit a request for sharing location to one or more other devices associated with the one or more emergency contacts;

receive locations for the one or more other devices of the one or more emergency contacts;

determine at least one other device from the one or more other devices in a close proximity to the at least one user device [302] based on a comparison of the locations of the one or more other devices and the current location information of the at least one user device [302]; and transmit, to the at least one other device, an emergency notification further comprising of the current location information of the at least one user device [302].

24. The system as claimed in claim 14, wherein the at least one user device [302] is attached to the eNodeB [304] on a non-access network channel, and the emergency call is transmitted by the at least one user device [302] to the eNodeB [304] on a SWu interface.

25. The system as claimed in claim 14, wherein the ESMLC [310] is configured to compute the current location information of the at least one user device [302] based on one of Assisted-GPS AGPS, Observed Time Difference of Arrival (OTDOA) and Enhanced Cell ID (UL-ECID).

26. The system as claimed in claim 14, wherein the current location information and the one or more parameters are combined to generate a https message, and said https message is provided to the identified at least one PSAP [322].

* * * * *